United States Patent
Wu

(10) Patent No.: US 6,309,582 B1
(45) Date of Patent: *Oct. 30, 2001

(54) METHOD FOR MAKING INSIGNIAS WITH RAISED DESIGNS INCLUDING TWO PRESSING STEPS

(76) Inventor: Sze Tsang Wu, P.O. Box 1-79, Taipei (TW), 100

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/184,062

(22) Filed: Nov. 2, 1998

Related U.S. Application Data

(62) Division of application No. 08/772,726, filed on Dec. 23, 1996, now Pat. No. 5,834,037.

(30) Foreign Application Priority Data

Dec. 25, 1995 (CN) .................................................. 95250121

(51) Int. Cl.⁷ ............................ B29C 33/02; B29C 33/08; B29C 65/20; B29C 65/32; B29C 65/74
(52) U.S. Cl. ......................... 264/403; 264/153; 264/163; 264/266; 264/296; 264/404; 264/480; 264/487; 264/491; 425/174.8 R; 156/219; 156/220; 156/251; 156/274.4; 156/277
(58) Field of Search ................................. 264/153, 163, 264/259, 266, 293, 294, 322, 443, 445, 480, 487, 491, 296, 402, 403, 404; 425/174.8 R, 299, 385, 304; 156/73.1, 274.4, 277, 219, 220, 251

(56) References Cited

U.S. PATENT DOCUMENTS

| | | | |
|---|---|---|---|
| 3,594,457 | * | 7/1971 | Wright .................................. 264/294 |
| 3,681,170 | * | 8/1972 | Pevitt, Jr. ............................. 156/360 |
| 3,711,362 | * | 1/1973 | Ballard ................................. 156/219 |
| 4,555,373 | * | 11/1985 | Bloemkolk ............................. 264/25 |
| 5,038,468 | * | 8/1991 | Wanatowicz ........................... 29/882 |
| 5,143,672 | * | 9/1992 | Kuwahara ............................. 156/219 |
| 5,599,416 | * | 2/1997 | Kuwahara ............................. 264/132 |
| 5,813,772 | * | 9/1998 | Magill et al. ................... 400/120.01 |

FOREIGN PATENT DOCUMENTS

851703 * 10/1960 (GB) .

* cited by examiner

Primary Examiner—Jan H. Silbaugh
Assistant Examiner—Michael I. Poe
(74) Attorney, Agent, or Firm—Ware, Fressola, Van Der Sluys & Adolphson LLP; Bradford Green

(57) ABSTRACT

A method and apparatus for making insignias with a raised design is capable of providing more aesthetic appearance to the insignias thus made. A base material consisting of a base sheet and a surface sheet overlaying the base sheet is prepared for making into an insignia. The base material is coating with a surface coating of decorative material. A bottom mold and an upper mold are used to press the base material to form raised design of patterns. The bottom and upper molds are coupled to a composite heating device including high-frequency induction and electric heating means for applying both high-frequency induction heat and electric heat to the base material while the upper molding is being pressed against the bottom mold. The upper mold is formed with a plurality of edge-defining blades for cutting an edge for the insignia, a plurality of pattern-defining blades for forming a pre-designed pattern on the insignia. During the pressing, the composite heat is concurrently applied to the upper and bottom mold so as to cut and melt away part of the surface sheet to form the pattern. The remnants cut away by the pattern-defining blades can be easily removed by brushes. The final product is an insignia with raised design of patterns with shining appearance.

7 Claims, 9 Drawing Sheets

METHOD FOR MAKING INSIGNIAS WITH RAISED DESIGNS INCLUDING TWO PRESSING STEPS

This application is a divisional application of prior U.S. patent application Ser. No. 08/772,726, filed on Dec. 23, 1996, entitled "Method and Apparatus for Making Insignias with Raised Designs" now U.S. Pat. No. 5,834,037.

BACKGROUND OF THE INVENTION

1. Field of the Invention

The present invention relates to a method for making insignias used as badges, chevrons, trademarks, or the like, and more particularly, to a method for making insignias with a raised design, which have a more prominent, distinctive and vivid appearance.

2. Description of Related Art

People usually attach insignias of special design on their clothing as an indication of something special, such as membership, authority or achievement. The insignias can also bear trademark designs symbolizing logos that are attached to fashionable goods such as jeans, purses and so on to promote their sales. The designs on insignias are usually made in relief so as to provide a more prominent, distinctive and vivid appearance. A conventional method for making insignias is to prepare a base sheet on which a decorative material shaped into a desired design is formed. A high-frequency heating machine is used to bond the decorative material on the base sheet and a mold having cutting blades is used to form the decorative material into a desired shape. After that, manual work is used to remove parts of the ornamental material that are cut away from the base sheet so as to form patterns on the insignia. The pattern on the insignia is pre-designed with the mold, which is made in advance according to customer specifications.

A conventional method for making insignias with raised designs is disclosed in U.S. Pat. No. 5,143,672, by Kuwahara, entitled "*Method for Forming Emblem of Thermoplastic Synthetic Resin Film*". The mechanism used to perform this method includes an engraving die having one or more fusion cutters thereon for pressing the film. During the pressing process, the film is high-frequency-induction heated by the engraving die such that it is partly melted away and thus reduced in thickness to allow the base to be visible through the film. This method is capable of forming fine patterns on the emblem. However, one drawback to this method is that it is still unable to form highly texturized patterns on the emblem. During the heating process of this method, the thermoplastic synthetic resin film is pressed to form recessed portions and raised portions that constitute a visually 3-D pattern on the emblem. However, the 3-D pattern is roughly formed and is thus still considered a plane pattern.

Moreover, the heating process of Kuwahara's method is carried out by high-frequency-induction. One drawback to this heating process is that the heat generated by the high-frequency-induction heating is not enough to treat thick base material. Therefore, the method can only be used to form thin emblems and cannot be used to form thick emblems.

Roughly speaking, under the condition that the heating temperature is fixed, the fineness of the pattern on the emblem is decreased as the thickness of the emblem is increased. The use of only the high-frequency-induction heating means to heat the emblem usually causes the formation of rough, fuzzy patterns on the emblem. Moreover, the edges of the emblem cut by the cutters are fluffy. With these drawbacks, the method is still unable to make highly texturized 3-D patterns on emblems.

SUMMARY OF THE INVENTION

It is therefore a primary objective of the present invention to provide a method for making insignias with raised designs by using a composite insulated heating device.

It is another objective of the present invention to provide a method for making insignias with fine and delicate patterns.

It is still another objective of the present invention to provide a method for making insignias with a prominent aesthetic appearance.

It is yet another objective of the present invention to provide a method by which the procedural steps for making an insignia are simplified.

In accordance with the foregoing and other objectives of the present invention, a new and improved method for making an insignia is provided. The method comprises the following steps of: (1) preparing a base material consisting of a base sheet and a surface sheet overlaying the base sheet, the base material being covered with a surface coating; (2) placing the base material between a bottom mold and an upper mold, the upper mold and/or bottom mold being coupled to a composite heating device including a high-frequency-induction heating device and an electric heating device, the upper mold being provided with a plurality of edge-defining blades near the edges, a plurality of pattern-defining blades which are shorter than the edge-defining blades, and a plurality of toothed surfaces which are formed with a plurality of pointed projections much shorter than the pattern-defining blades; (3) pressing the upper mold against the bottom mold so as to form the base material with a raised design of patterns, and meanwhile applying the composite heat to the bottom and upper molds from the high-frequency-induction heating device and the electric heating device, whereby the edge-defining blades cut an edge for the insignia and the pattern-defining blades form a pattern on the insignia; and (4) removing remnants cut away by the pattern-defining blades.

BRIEF DESCRIPTION OF DRAWINGS

The present invention can be more fully understood by reading the subsequent detailed description of the preferred embodiments thereof with references made to the accompanying drawings, wherein.

DETAILED DESCRIPTION OF THE PREFERRED EMBODIMENT

Figure 1:
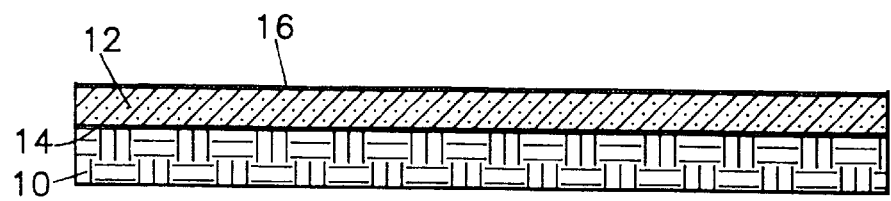
FIG. 1 shows a cross-sectional diagram depicting the initial step involved in the method according to the present invention for making an insignia.

Referring to FIG. 1, the base material for making an insignia by the method according to the present invention is a base sheet 10 overlaid with a surface sheet 12. The base sheet 10 can be made of woven fabric, non-woven fabric, synthetic leather, plastic, or the like, and the surface sheet 12 is a sheet of heat-deformable synthetic resin such as polyvinyl chloride or polyurethane. An adhesive layer 14 is coated on the bottom of the surface sheet 12 so as to glue the surface sheet 12 to the base sheet 10. A surface coating 16, which can be a deposited layer of metal, a printed layer of oil ink or a laser-photochromic display layer, is formed over the surface sheet 12. Alternatively, the surface coating 16 can be formed by depositing a layer of metal first and then printing a layer of oil ink over the metal layer.

Figure 2:
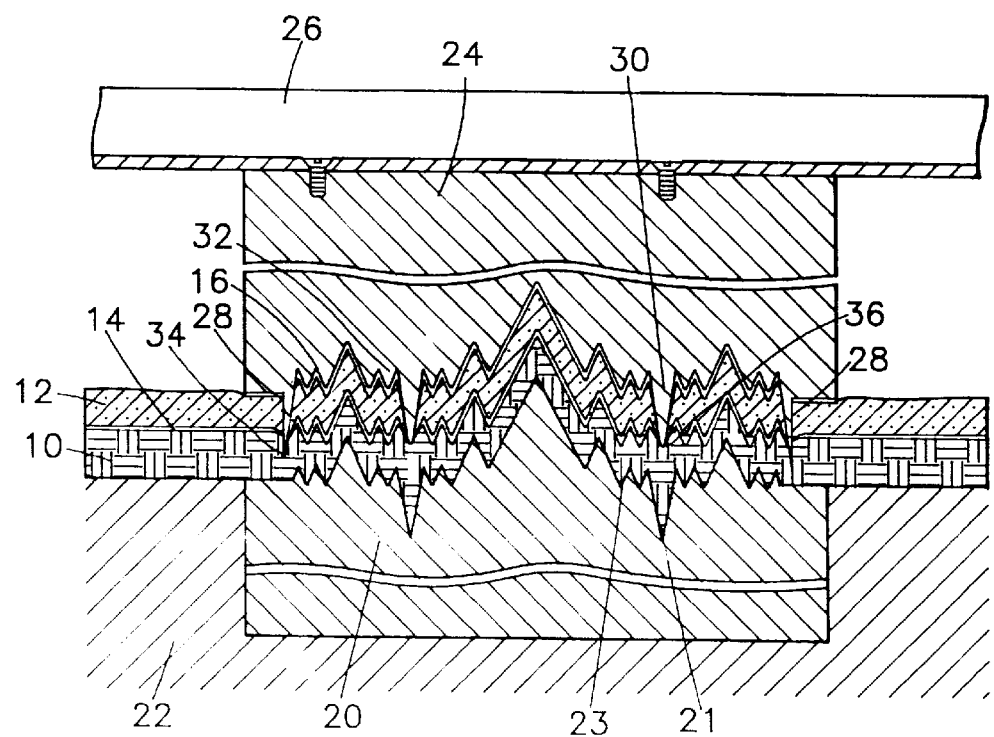
FIG. 2 is a cross-sectional view depicting a heating and pressing step involved in the method according to the present invention for making an insignia.
Figure 3:
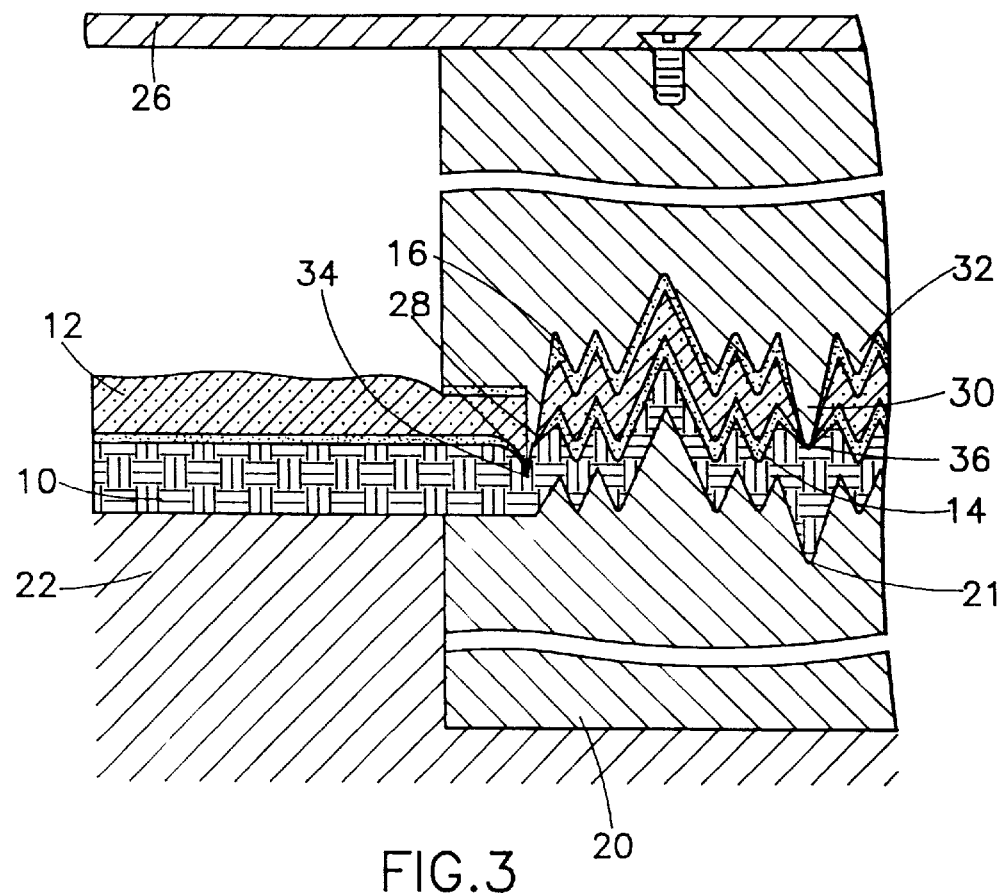
FIG. 3 shows an enlarged view of part of FIG. 2.

Referring to FIG. 2 together with FIG. 3, the base material is placed on a bottom mold 20 mounted on a platform 22 on a composite heating machine that includes high-frequency induction and electric heating means for the composite heating purpose. The bottom mold 20 is made of a metal or non-metal material, such as zinc, copper, steel, alloy, plastic or plaster. A movable upper mold 24 is mounted above the platform 22 and is used to press against the base material laying between it and the bottom mold 20. The bottom mold 20 and the upper mold 24 are respectively electrically coupled to the opposite electrodes of an electricity source on the composite heating machine, which is used to perform a composite insulation heating process on the base material.

Figure 4:
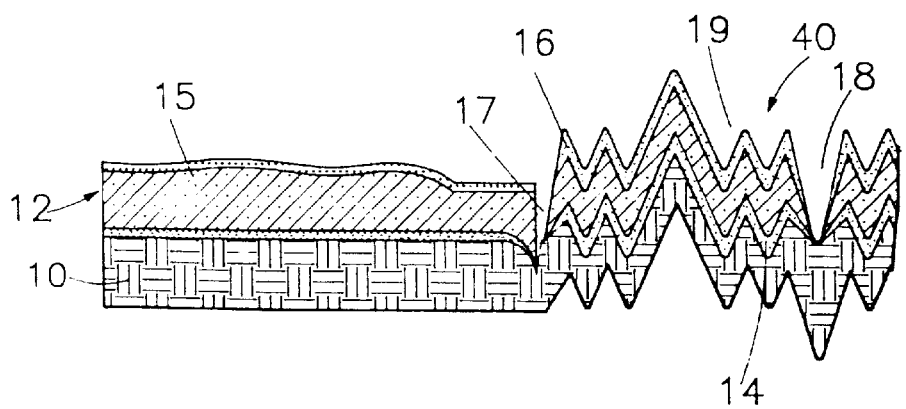
FIG. 4 shows an enlarged view of part of FIG. 3.
Figure 5:
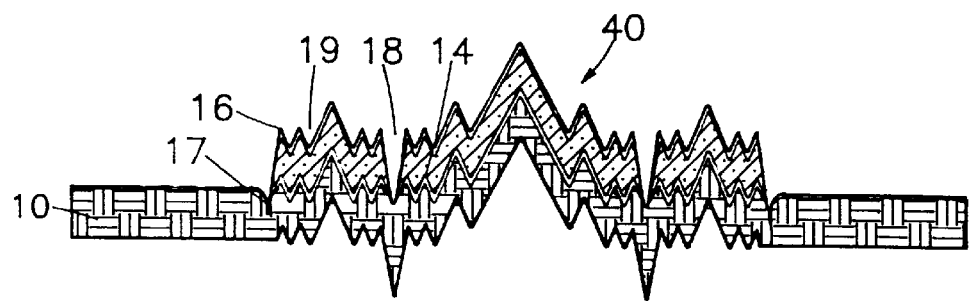
FIG. 5 shows a cross-sectional view of the finished product of an insignia made by t he method according to the present invention.

Referring also to FIGS. 2–4, the bottom mold 20 is provided with a plurality of toothed surfaces 23 and that of a pattern-defining recess 21; and the upper mold 24 is formed with a plurality of edge-defining blades 28 for cutting an edge for the insignia, a plurality of pattern-defining blades 30 (which are slightly shorter than the edge-defining blades 28) for forming a pre-designed pattern on the insignia, and a plurality of surfaces 32, which are formed with a plurality of pointed projections much shorter than the pattern-defining blades 30, and collectively used to press against the base material. The edge-defining blades 28 are each formed with a pointed tip 34 used to define the edge 17 (see FIG. 4) of the insignia to be made from the base material. The pattern-defining blades 30 are each formed with a pointed tip 36 not as sharp as that of the edge-defining blades 28 and a length slightly less than the overall length of the surface sheet 12 plus its upper and bottom coatings. When the pattern-defining blades 30 are pressed against the surface sheet 12, the surface coating 16 on the surface sheet 12 will be cut apart by the application of heat and pressure thereto and part of the adhesive layer 14 that is in contact with the pointed tips 36 will melt into liquid, which then infiltrates into the base sheet 10 so as to glue the surface sheet 12 to the base sheet 10. Each pattern-defining blade 30 thus creates a groove 18 on the surface sheet 12, as illustrated in FIG. 4. The surface 32 is used to press against the surface coating 16 on the surface sheet 12 but will not break it so as to impress a grain-like pattern 19 thereon. During the heating and pressing, those portions of the surface sheet 12 and the adhesive layer 14 that are in contact with the pointed tips 36 will be melted into liquid, which then infiltrates into the base sheet 10, allowing the surface sheet 12 to be glued to the base sheet 10.

Referring to FIGS. 3, 4, 5, and 8B, since the edge-defining blades 28 are used to cut and define the edge 17 of the insignia, the part 15 of the base material that is to be cut away is not included within the range that is to be pressed by the upper mold 24. Therefore, the cutaway part 15 can be easily removed by workers with suitable tools. On the surface sheet 12, grooves 18 and grain-like patterns 19 are formed. The grooves 18 are pressed by the pointed tip 36 to a depth that allows the underlying base sheet to be substantially visible. This allows the surface coating 16 to display a shiny and contrasting appearance due to the quality of the overlaying material, i.e., the deposited layer of metal or printed layer of ink. This appearance is similar to or better than the insignias that are made by weaving golden threads on fabrics.

In the foregoing process, if it is desired to have a more plump look, a foam member made of heat-deformable synthetic resin, such as polyvinyl chloride or polyurethane, can be inset between the base sheet 10 and the surface sheet 12.

Furthermore, a protective film made of plastic can be attached on the bottom side of the finished product of the insignia. After purchase, the consumer can easily remove the protective film and use an iron or thermal-transfer printing means or the like to heat and attach the insignia onto clothing, hats or similar articles.

Figure 6:
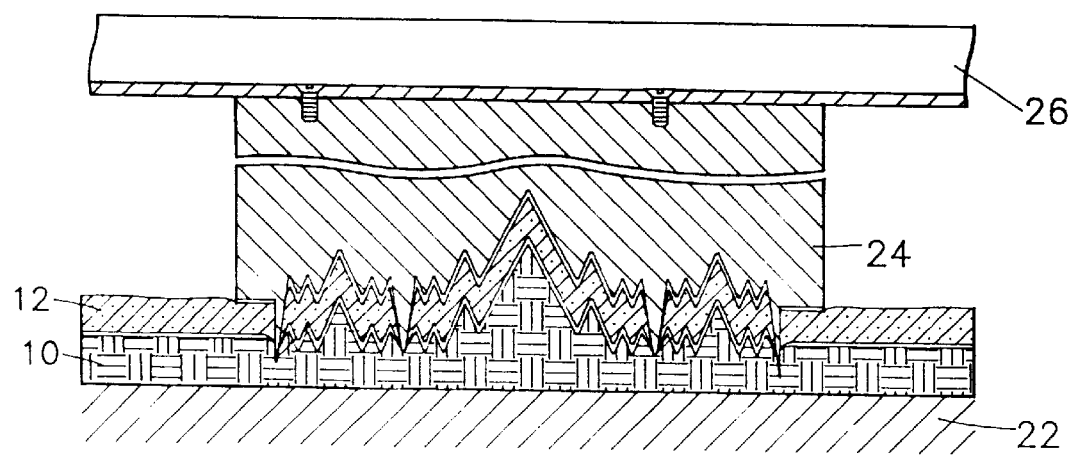
FIG. 6 shows a cross-sectional view of the finished product of an insignia made by u sing a single upper mold to heat and press the base material.

Referring to FIG. 6, in other embodiments, a single mold can be used instead of two, as in the previous embodiment, to apply heat and pressure to the base material of the insignia. Here, in the heating and pressing process, the base material of the insignia is placed on the platform 22 and then a movable mold 24b mounted on a support 26 is used to apply pressure thereto.

Figure 7A:
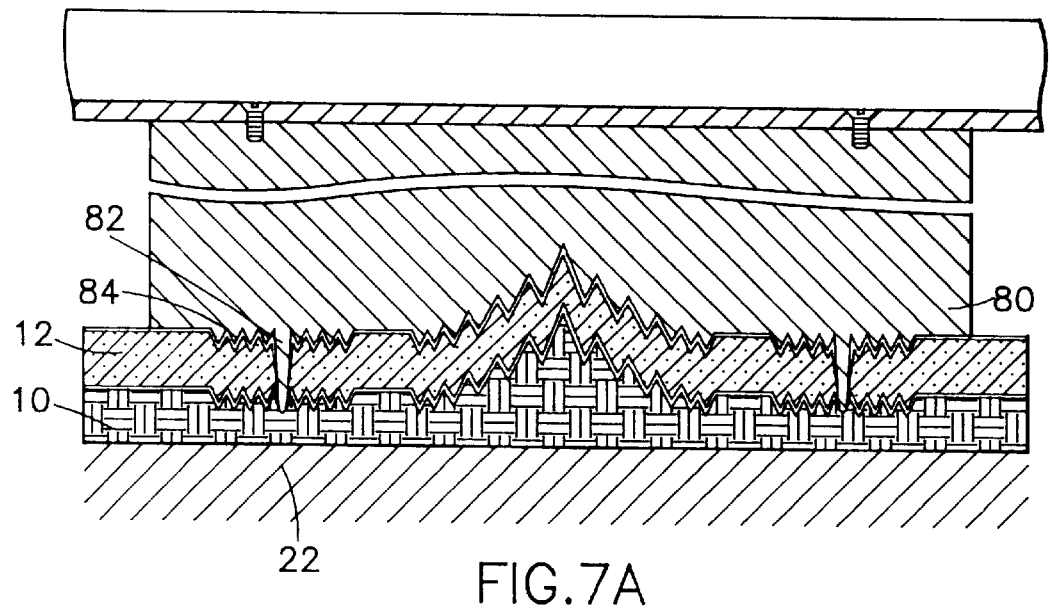
FIG. 7A is a cross-sectional diagram used to depict a heating and pressing step carried out by a first upper mold in the apparatus according to the present invention for making the insignia.
Figure 7B:
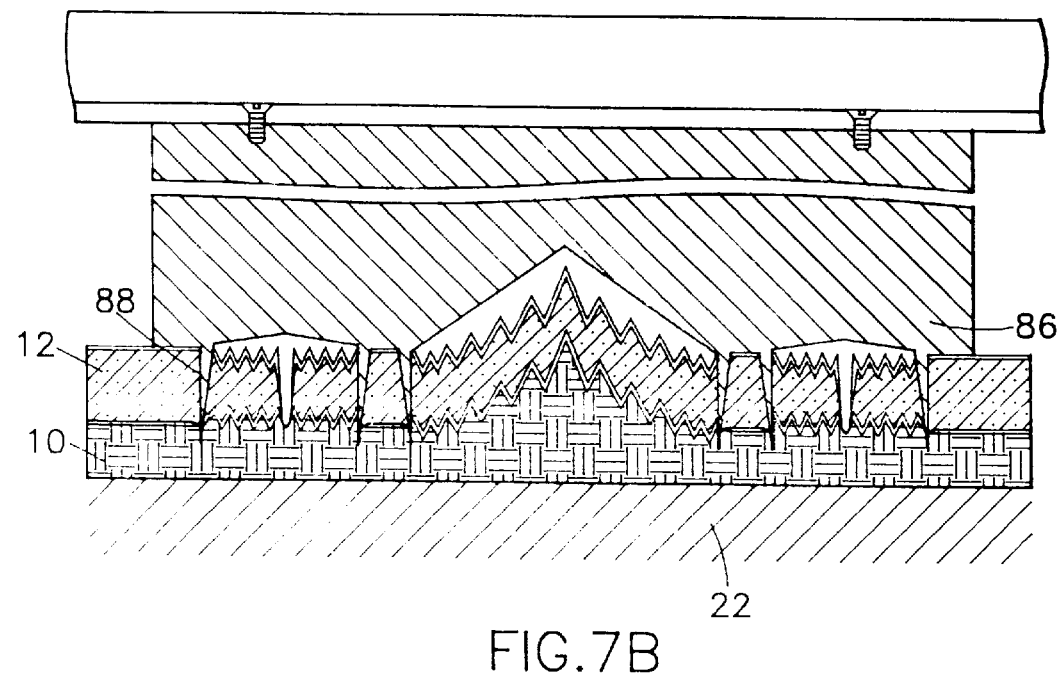
FIG. 7B is a cross-sectional diagram used to depict a heating and pressing step carried out by a second upper mold in the apparatus according to the present invention for making the insignia.

In order to allow the raised pattern on the insignia to be more sharply defined, the above-mentioned composite heating and pressing process can be carried out for the second round. As shown in FIG. 7A, in this process, a first movable upper mold 80, formed with a plurality of pattern-defining blades 82 and a plurality of pattern surfaces 84, is used to press against the base material of the insignia so as to form a pattern of raised patterns of narrow width. Subsequently, as shown in FIG. 7B, a second movable upper mold 86, formed with a plurality of edge-defining blades 88, is used to press the base material of the insignia for the second round so as to define the edge of the insignia.

When the finished insignia has a thickness of above 5 to 10 mm by specification, the pattern formed on the insignia may not be clear-cut and the edge thereof could be fuzzy if the pressing and heating process was carried out only once. To eliminate this unfavorable appearance, the pressing and composite heating process should be carried out at least twice.

Figure 7C:
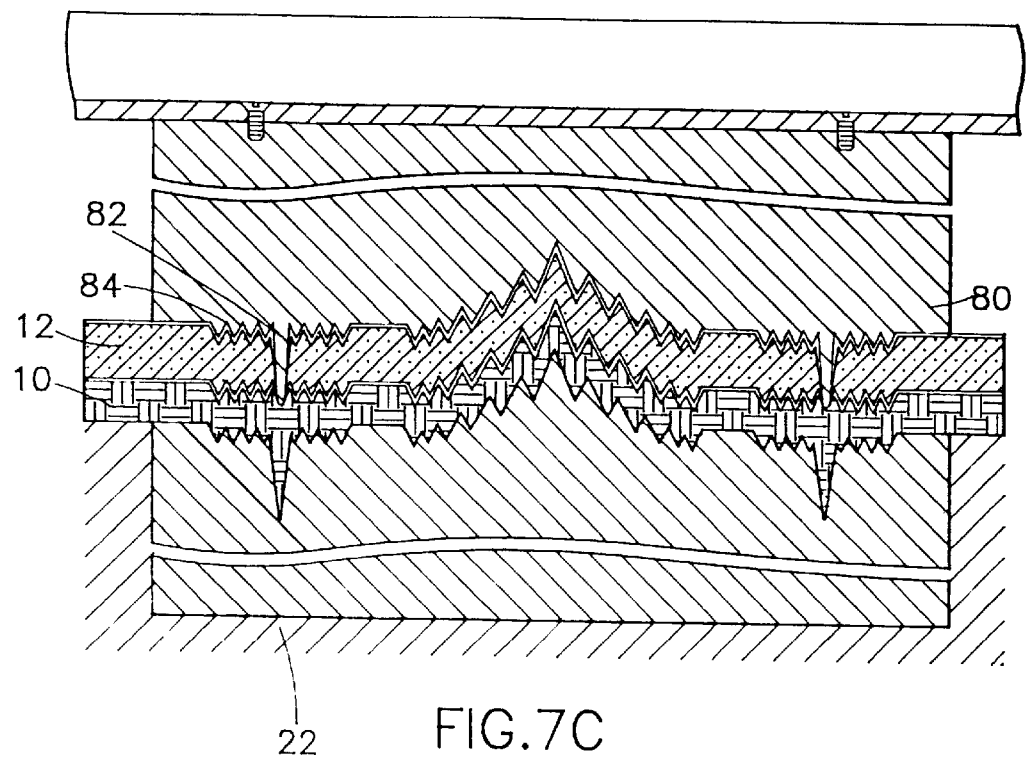
FIG. 7C is a cross-sectional view of the base material being heated and pressed by a set of first movable upper and bottom molds in a first stage.
Figure 7D:
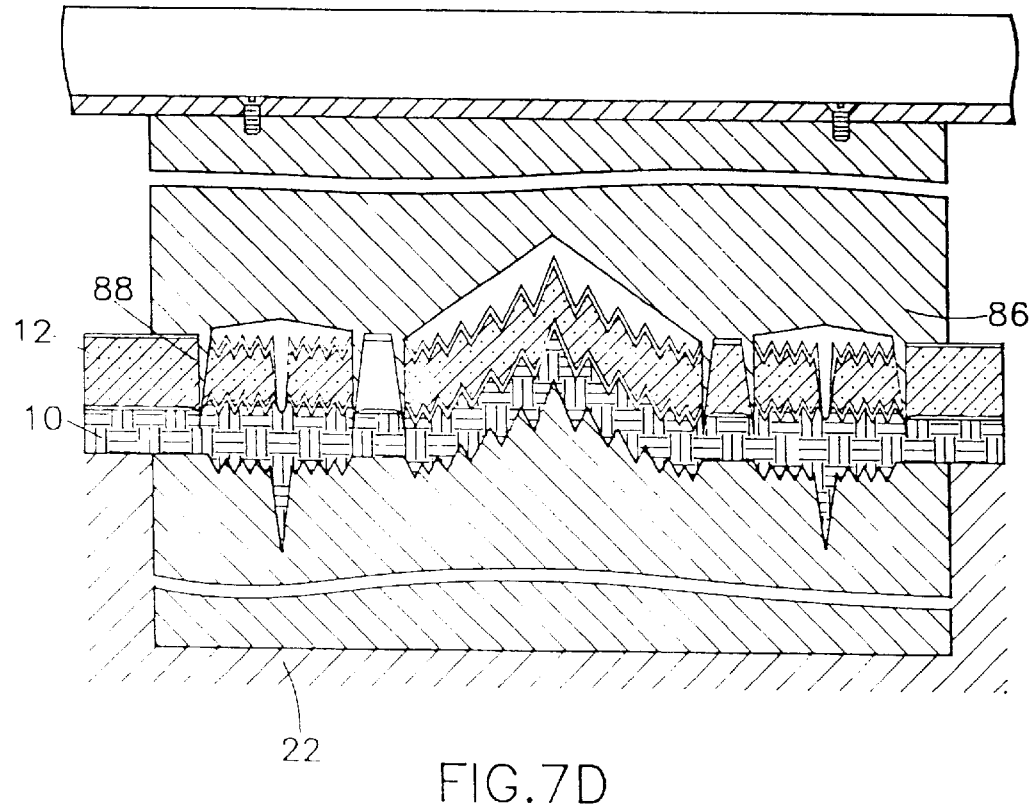
FIG. 7D is a cross-sectional view of the base material being heated and pressed by a set of second movable upper and bottom molds in a second stage.
Figure 8A:
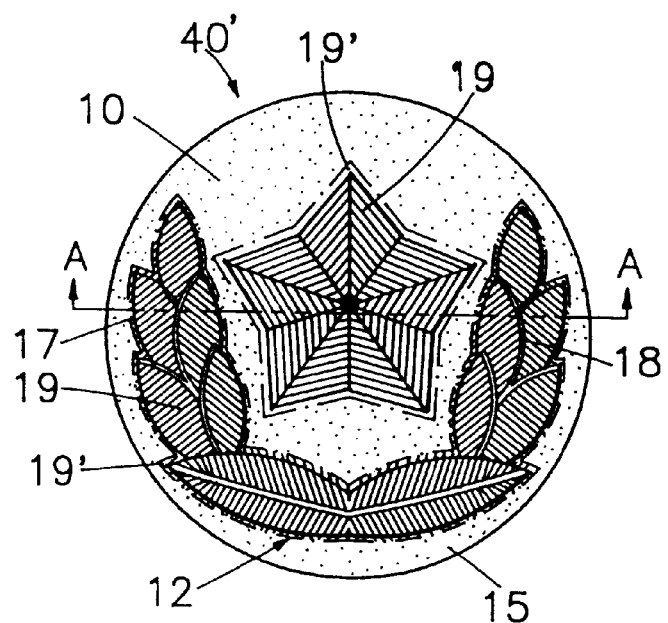
FIG. 8A is a top view of the semi-finished insignia which is made through the process depicted in FIG. 7C.
Figure 8B:
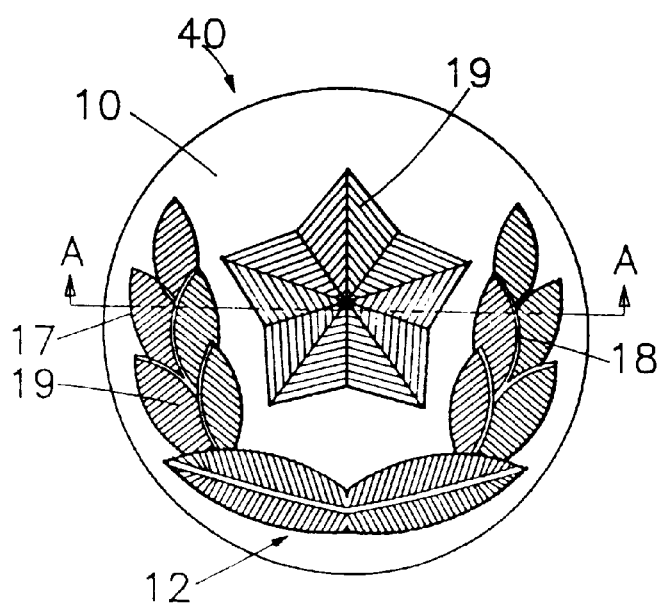
FIG. 8B is a top view of the semi-finished insignia which is made through the processes depicted in FIG. 7C and FIG. 7D.

Referring to FIG. 7C, a first movable upper mold 80, having a pressing cutting knife 82 (which services as a pattern-defining knife) and/or a pressing surface 84, is used in combination with a fixed bottom mold 90 having a pattern-defining recess 91 and a pattern-defined top surface 911 used for the first stage heating and pressing process on the base sheet 10 and surface sheet 12. This allows the finished insignia to have clear-cut patterns with fine line textures, as, for example, the one shown in FIG. 8A. After that, as illustrated in FIG. 7D, a second movable upper mold 86 having a plurality of heat-cutting knives 88 (which serve as edge-defining knives) is used in combination with the fixed bottom mold 90 for the second stage heating and pressing process on the same. This cuts away the fuzzy edge on the patterns such that the patterns appear to be more clear-cut, allowing the insignia 40 to have a more distinct look as, for example, the one shown in FIG. 8B. Further, the area of the pressing surface 84 of the first movable upper mold 80 can be greater than the area bounded by the heat-cutting knife 88 on the second movable upper mold 86, such that after completion of the first stage heating and pressing process, the semi-finished insignia 40', as shown in FIG. 8A, has an additional edge texture 19' formed around the main pattern. This edge texture 19' can be removed along with the surface part 15 beyond the outline 17 of the desired pattern on the insignia in the subsequent second stage heating and pressing process. This allows the insignia 40, as the one shown in FIG. 8B, to be formed with clear-cut, precisely-aligned patterns. In conclusion, the pressing cutting knife 82, the pressing surface 84, and heat-cutting knife 88 on the first second movable modes 80, 86 can be used to form the pattern, as shown in FIG. 8B. Taking a cross section in FIG. 8B, for example, the apparatus should be provided with three pressing cutting knives 82, a number of pressing surfaces 84, and six heat-cutting knives 88, as shown in FIG. 7D.

Figure 9:
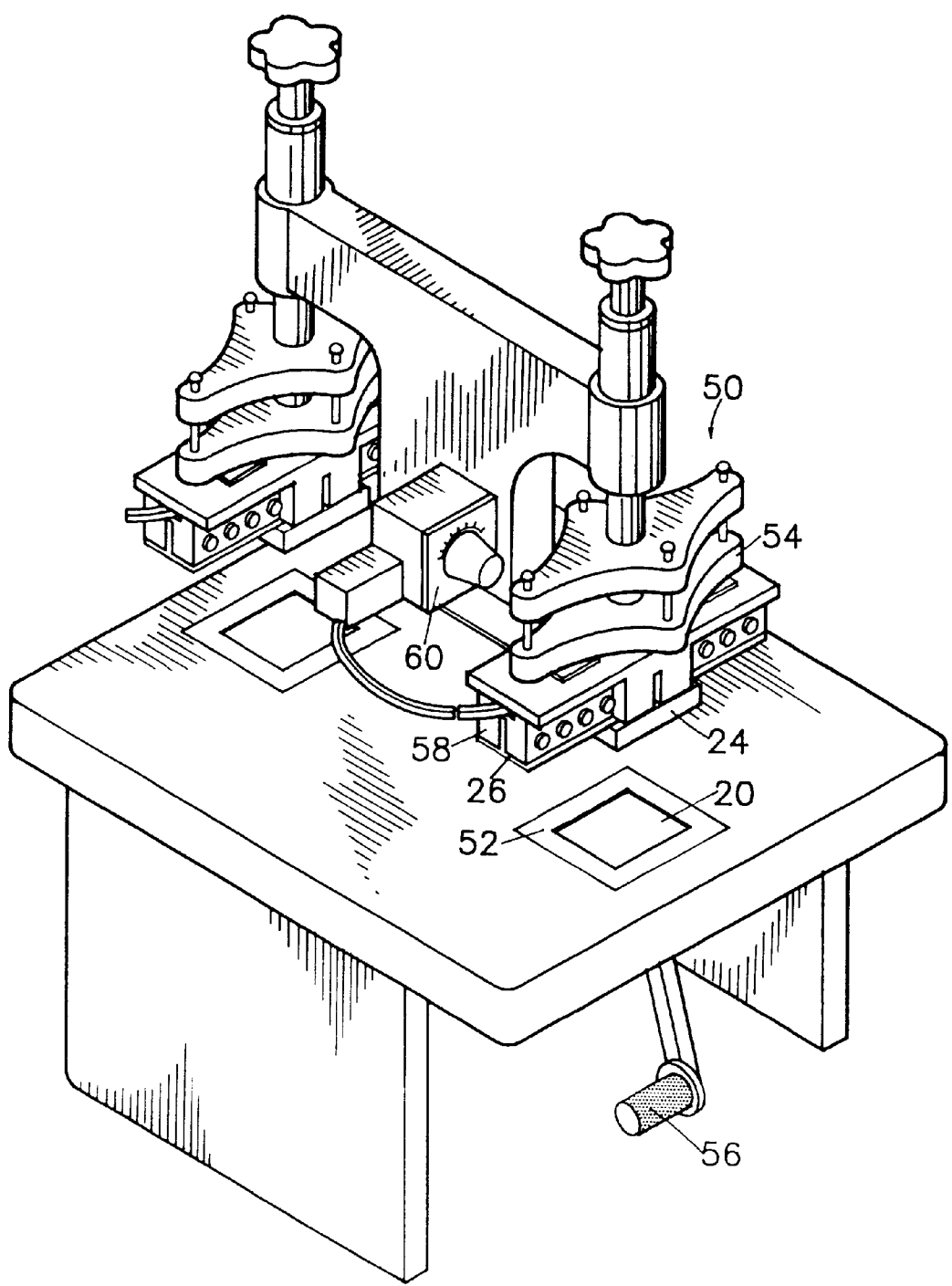
FIG. 9 shows a perspective view of the apparatus according to the present invention for making an insignia.
Figure 10:
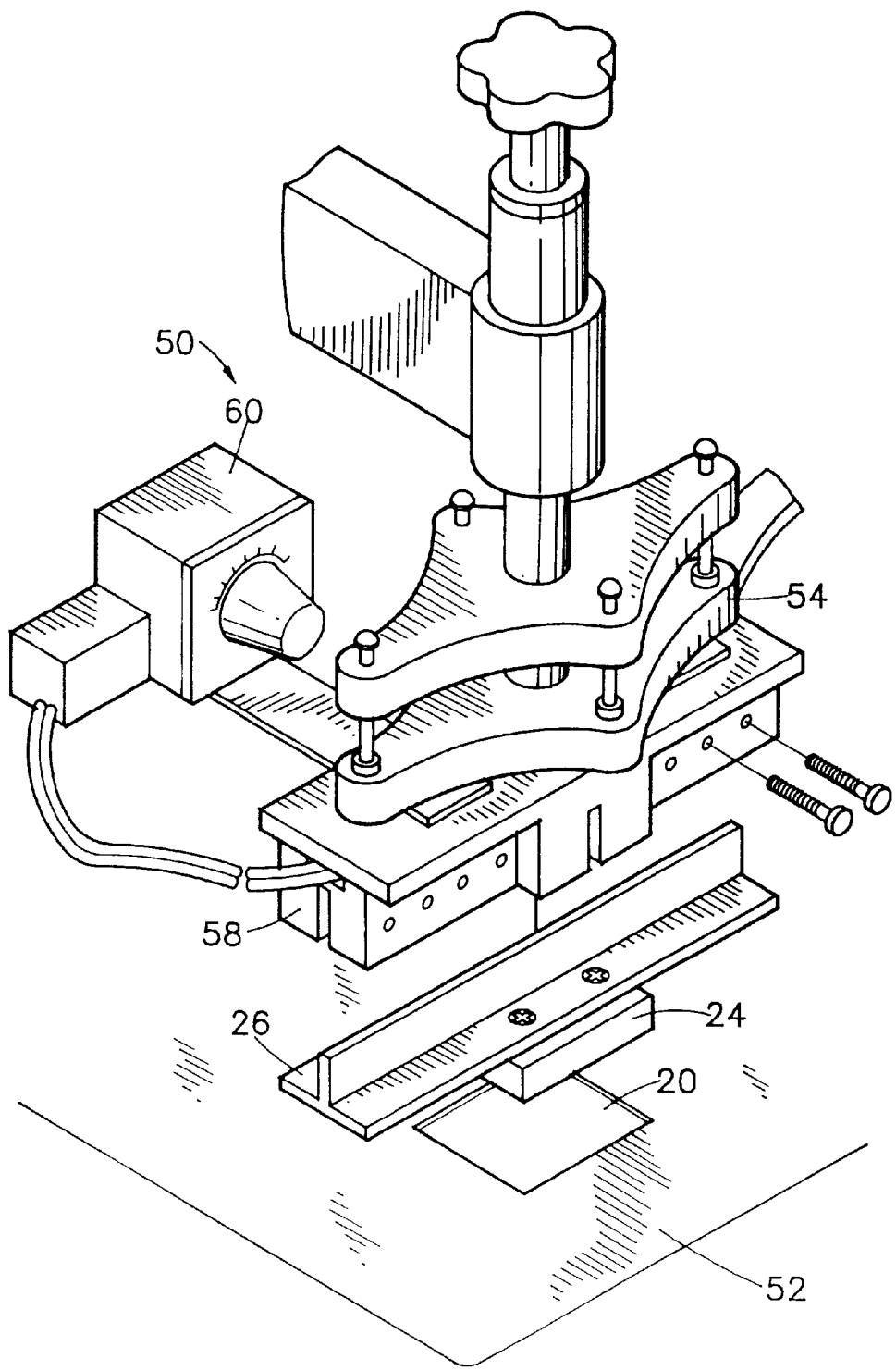
FIG. 10 shows an enlarged view of part of the apparatus of FIG. 9.

Referring to FIG. 9 together with FIG. 10, the heating means employed by the present invention can be a high-frequency induction heater combined with an electric heater, supersonic wave heater, or the like. FIG. 10 shows a combined heating apparatus 50 that includes both the high-frequency induction heater and the electric heater in a unit. The apparatus includes a bottom mold 20 coupled electrically to a first electrode 52 on the heating apparatus and an upper mold 24 coupled electrically to a second electrode 54. In the operation, the base material of the insignia is first placed at a fixed position on the bottom mold 20. Then the operator can tread on a pedal 56 so as to move the upper mold 24 downwards, thereby allowing the upper mold 24 and the bottom mold 20 to together clasp the base material of the insignia placed therebetween. Further, in the case of using a single mold to form the insignia, an auxiliary pressing means, such as a pneumatic or hydraulic means, can be used to add more pressing force to the insignia. Meanwhile, electricity is applied to the electrodes 52, 54, causing the molds 20, 24 to generate heat to the base material of the insignia and thereby heating the base sheet 10 and the surface sheet 12 together. After the process is completed, the operator releases the pedal 56, which causes the upper mold 24 to move back to the original position. An insignia with raised design is thus produced.

The high-frequency induction heater, used for generating heat, and the pedal, used for moving the upper mold down, are both known in the art.

The heating device 58 for temperature adjustment is further coupled integrally between the platform 26 and the electrode 54. The magnetic flux generated by the electrode 54 and the heat generated by the heating device 58 can thus be combined and transferred to the upper mold 24 and/or the bottom mold 20. These two heat sources are referred to hereinafter in this specification as "composite heat". The use of composite heat not only significantly shortens the process time, but also allows the apparatus to handle base material of substantial thickness. The drawback of the high-frequency induction heater used in prior art that causes base material of substantial thickness to be insufficiently heated is therefore eliminated. Moreover, the heating device 58 can be manually adjusted by a temperature regulating switch 60 in accordance with the thickness and quality of the base material to generate a sufficient amount of heat for the process.

Figure 11:
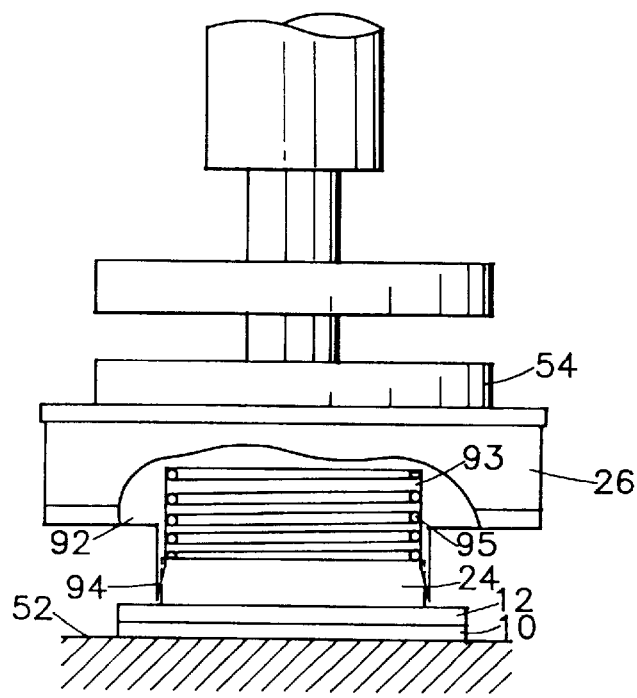
FIG. 11 shows a side view of the movable upper mold being linked to a cutting knife.
Figure 12:
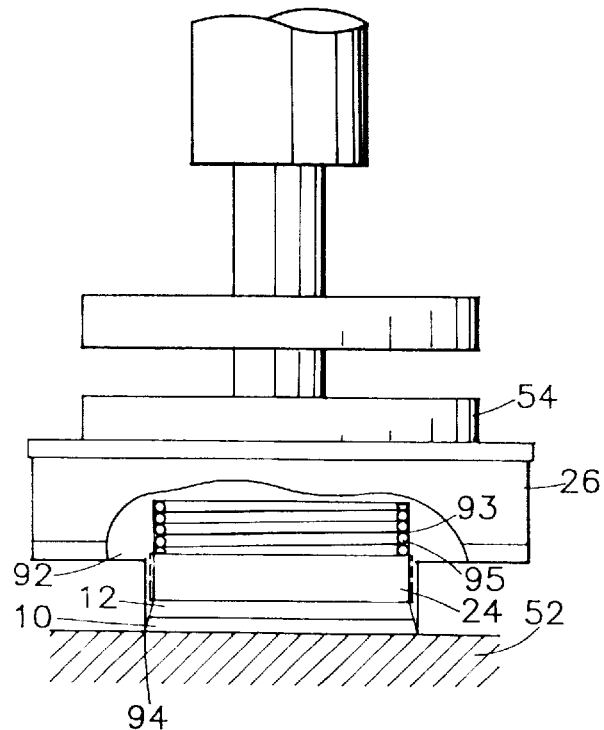
FIG. 12 shows the same as FIG. 11 except for showing the cutting knife being moved downwards to cut away unwanted portions of the insignia.

Referring together to FIG. 11 and FIG. 12, the movable upper mold 24 can be alternatively coupled to the inside of a recess 93 in the knife holder 92. The knife holder 92 is fixed at a position below the platform 26 and has its periphery formed with cutting knives 94 which are used to cut away unwanted parts of the finished insignia. A buffer spring 95 is set between the movable upper mold 24 and the recess 93. When operating the apparatus to make the insignia, the platform 26 along with the knife holder 92 will be driven downwards to a first position, as illustrated in FIG. 11, in which position the movable upper mold 24 comes into contact with the surface sheet 12, but the cutting knives 94 are kept a distance away from the base material. Under this setup, the foregoing heating and pressing process is carried out. After this, the platform 26, along with the knife holder 92, is driven further downwards to a second position, as illustrated in FIG. 12. In this position, the cutting knives 94 cut away the unwanted parts of the base sheet 10 and surface sheet 12 beyond the finished insignia. At this time, the buffer spring 95 acts as a resistance to the downward movement of the movable upper mold 24, allowing the movable upper mold 24 to stay at the first position when the knife holder 92 is moved to the second position, thus preventing the insignia from being broken apart. By the foregoing arrangement, the heating and pressing process and the process of removing unwanted parts can be combined into a single process, which significantly simplifies the manufacture of insignias.

The present invention has been described hereto with exemplary preferred embodiments. However, it is to be understood that the scope of the present invention need not be limited to the disclosed preferred embodiments. On the contrary, it is intended to cover various modifications and similar arrangements within the scope defined in the following appended claims. The scope of the claims should be accorded the broadest interpretation so as to encompass all such modifications and similar arrangements.

What is claimed is:

1. A method of making an insignia with a raised design and an edge, comprising the steps of:
   (1) providing a base material consisting of a base sheet and a surface sheet overlaying the base sheet, the base material being covered with a surface coating;
   (2) placing the base material on a bottom mold;
   (3) pressing a first upper mold comprising a pressing surface formed with a plurality of pattern-defining blades on the base sheet against the bottom mold to form on the base material a pattern of the raised design with the plurality of pattern-defining blades, wherein the first upper mold is operatively connected to a first composite heating device including high-frequency induction and electric heating means and wherein the first composite heating device applies high-frequency induction heat and electric heat to the base material while the first mold is being pressed on the base material; and (4) pressing a second upper mold comprising a plurality of edge-defining blades thereon on the base material against the bottom mold to form the edge of the insignia with the plurality of edge-defining blades, wherein the second upper mold is operatively connected to a second composite heating device including high-frequency induction and electric heating means and wherein the second composite heating device applies high-frequency induction heat and electric heat to the base material while the second mold is being pressed on the base material.

2. A method, according to claim 1, further comprising the step of attaching a protective layer on the bottom of the insignia for attaching the insignia to a desired article.

3. A method according to claim 1, wherein the bottom mold is made of non-metal material.

4. A method according to claim 1, wherein the bottom mold is made of metal material.

5. A method, according to claim 1, further comprising the step of removing remnants cut away by the pattern-defining blades.

6. A method, according to claim 1, further comprising the steps of:
(a) providing a layer of plated metal on the surface sheet;
(b) providing a layer of colored material on the plated metal layer; and
(c) providing a protective layer on the plated metal layer.

7. A method, according to claim 6, wherein the layer of colored material comprises a laser photochromic display layer.

* * * * *

UNITED STATES PATENT AND TRADEMARK OFFICE
CERTIFICATE OF CORRECTION

PATENT NO. : 6,309,582 B1 Page 1 of 1
DATED : October 30, 2001
INVENTOR(S) : Wu

It is certified that error appears in the above-identified patent and that said Letters Patent is hereby corrected as shown below:

<u>Title page,</u>
Item [56], References Cited, class/subclass for 9/1992 Kuwahara should be
-- 264/132 --
Class/subclass for 2/1997 Kuwahara should be -- 156/219 --

Signed and Sealed this

Second Day of July, 2002

Attest:

Attesting Officer

JAMES E. ROGAN
Director of the United States Patent and Trademark Office